Jan. 23, 1968     J. S. ALFORD     3,364,678
MEANS FOR STABILIZING FLUID FLOW IN DIFFUSER-COMBUSTOR
SYSTEMS IN AXIAL FLOW GAS TURBINE ENGINES
Filed Feb. 28, 1966
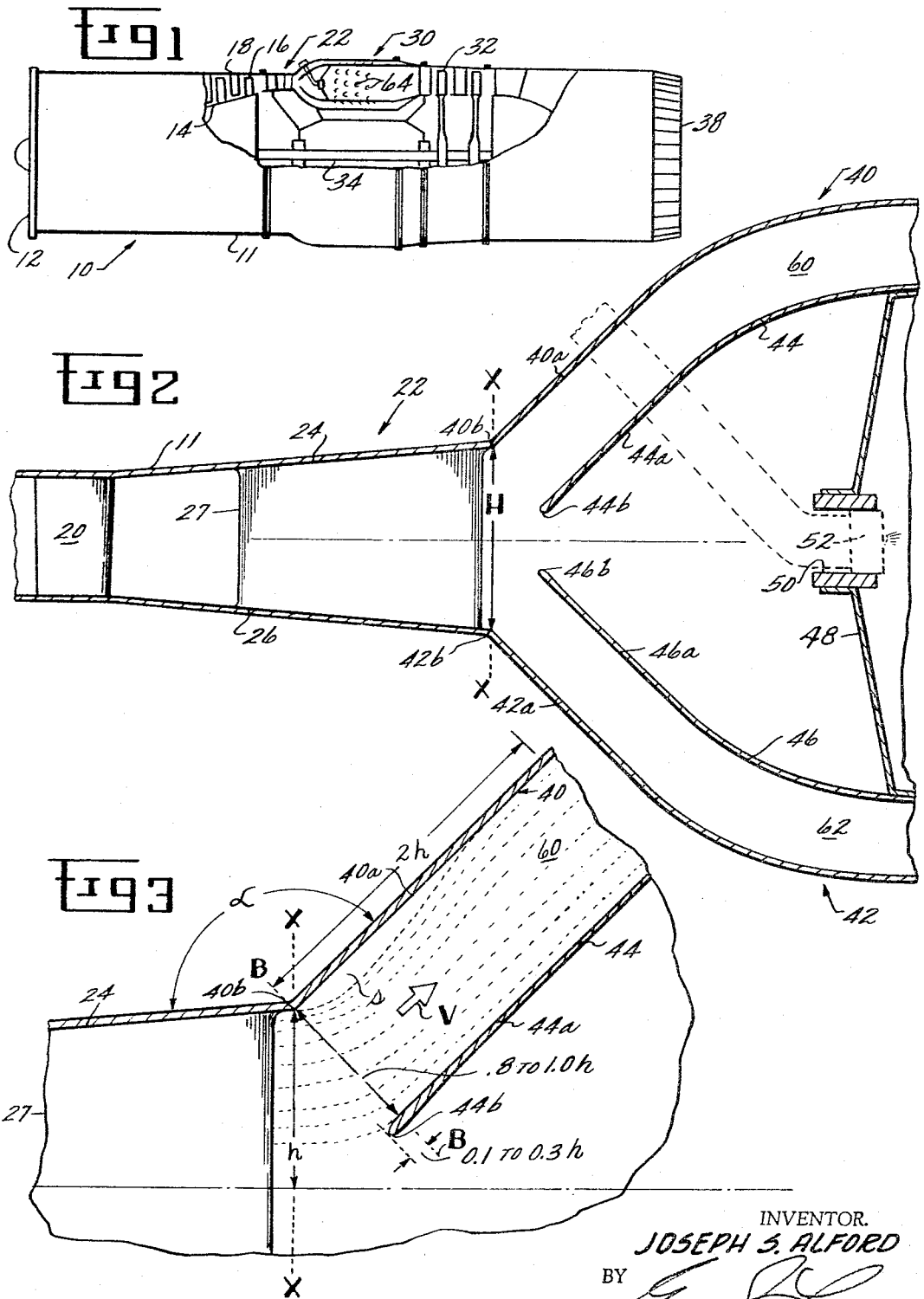
INVENTOR.
JOSEPH S. ALFORD
BY
ATTORNEY United States Patent Office 3,364,678
Patented Jan. 23, 1968

3,364,678
MEANS FOR STABILIZING FLUID FLOW IN DIFFUSER-COMBUSTOR SYSTEMS IN AXIAL FLOW GAS TURBINE ENGINES
Joseph S. Alford, Wyoming, Ohio, assignor to General Electric Company, a corporation of New York
Filed Feb. 28, 1966, Ser. No. 530,599
8 Claims. (Cl. 60—39.65)

ABSTRACT OF THE DISCLOSURE

The disclosure shows a coupling between a diffuser and the inlet to a combustor wherein the combustor comprises casing members and liners providing for the flow of cooling air around the combustor as well as entry of primary combustion air into the combustor. The provision of an abrupt change in angle between the diffusers and the casings and specified relationships between the casings and liners provides a controlled anchor point for air flow as it separates in passing from the diffuser to the spacing between the casings and liners. This results in greater stability of operation.

---

Gas turbine engines of the type referred to comprise an axial flow compressor which provides pressurized air to a continuous flow combustor. The present invention deals particularly with engines employing annular combustors comprising inner and outer walls and a pair of spaced liners therebetween which define three concentric flow paths. Normally air discharged from the compressor passes through a divergent, annular passageway which is known as a diffuser. From the diffuser the air stream is split into the three flow paths through the combustor. Combustion of fuel is maintained in the central flow path between the liners, while the outer flow paths provide cooling air and also additional air for supporting further combustion of the fuel downstream of the liner.

In many compressors circumferential pressure gradients exist in the pressuried air stream discharged from the compressor. Pressure gradients may also be attributed to radial support struts commonly extending through the diffuser. Such pressure gradients tend to fluctuate during operation of the engine and cause changes in the points where the air stream attaches to the diffuser walls. Such fluctuation causes self-excited accoustical oscillation and vibration which are harmful to the engine structure and to engine operation. These fluctuations also cause or accentuate circumferential, thermal gradients and result in "hot streaks" which can greatly reduce the life of the combustor and/or the engine turbine.

The object of the invention is to minimize, if not eliminate, the air flow instablility problems in gas turbine engines discussed above.

The above, brief description of air flow from a diffuser to a combustor in a gas turbine engine sets the environment for the present invention. This environment may be more specifically described by pointing out that the combustor walls and adjacent liners are respectively mutually convergent to define entrances to the outer flow paths which have a nominal divergent direction from the central flow path through the combustor.

In its broader aspects the invention is characterized by the diffuser having a ratio of outlet to inlet area below a value required to insure that lack of any flow separation occurs along the diffuser walls. The convergent portion of at least one combustor wall joins the diffuser wall at a sharp angle or "break" and the convergent portion of the adjacent liner defines, in combination therewith the air flow path having a nominal divergent direction. The specified adjacent liner extends inwardly at least to a plane normal to the nominal divergent flow path and intersecting the sharp angle of the juncture of the diffuser and combustor walls.

In this fashion the air flow is "anchored" to the diffuser wall immediately upstream of the sharp break where the combustor wall joins it. Immediately downstream and along the divergent flow path from this sharp break, a controlled separation occurs. Thereafter as the divergent flow reattaches itself to the combustor wall and a stabilized condition is obtained wherein the controlled separation which is maintained circumferentially, minimizes, if not eliminates, vibrations and thermal "hot streaks" resulting from pressure gradients primarily attributable to the characteristics of the axial flow compressor supplying pressurized air for the combustor.

These and other objects, features and advantages of my invention will be apparent from the following detailed description taken together with the accompanying drawings in which:

FIG. 1 is a schematic view in cross-section of a typical axial-flow gas turbine engine in which the invention has been incorporated;

FIG. 2 is a partial view, enlarged and in cross-section, of the compressor discharge area, diffuser and general inlet area of the combustor chamber of the engine of FIG. 1; and FIG. 3 is a further enlarged view of the junction between the diffuser and combustor illustrating the air flow therebetween.

Turning now specifically to FIG. 1 indicated generally at 10 is a gas turbine engine of the well-known turbojet variety. While this is used as an example to illustrate the invention it will be understood that the invention has application to any apparatus utilizing a continuous fluid flow combustion system, for example, aircraft turbofan or land-based combustion engines. In any event, as shown in FIG. 1 the turbojet 10 includes an outer housing 11 having an inlet end 12, receiving air which enters a multistage axial flow compressor 14 having rows of rotor blades 16. Interspersed with the rotor blade rows are rows of stator blades 18. The stator blades are affixed at one end to the inner surface of the housing 11. At the downstream end of the compressor is a row of compressor outlet guide vanes (OGV's) 20, followed by an annular diffuser passage or compressor discharge passage indicated generally at 22.

The compressor discharge passage or diffuser duct 22 comprises a pair of concentric inner and outer walls 24 and 26, respectively, divergent in a downstream direction. Struts 27 (FIG. 2) span the diffuser and comprise part of the structural components of the engine in normal fashion. The diffuser discharges the pressurized air into a combustor indicated generally at 30 from whence the heated gases exit at high velocity through the power turbine 32. The power turbine extracts work to drive the compressor 14 by means of a connecting shaft 34 on which both components are mounted. The rotating compressor-turbine set is mounted in the engine by suitable bearing means. The hot gas stream leaving the turbine is discharged to atmosphere—to provide thrust—through an exhaust nozzle which may be of the adjustable type, as shown at 38 in FIG. 1.

Referring now to the enlarged view of FIG. 2, it will be seen that the combustor comprises an outer casing wall, indicated generally at 40, and an inner casing wall, indicated generally at 42. The outer and inner walls are spaced from a pair of outer and inner combustion chamber liners, indicated generally at 44 and 46 respectively. The liner wall members are appropriately supported in the combustor and are interconnected at their forward ends by an annular wall 48. Intermediate the radially spaced ends of wall 48 is an opening 50 adapted to receive a fuel nozzle 52, illustrated in phantom in FIG. 2 and shown in solid lines in FIG. 1. Nozzle 52 is supplied, in the usual manner, with fuel to support combustion. The combustor 30, as will be perceived from the drawings is of the annular type, as contrasted to the can or cannular variety.

It will be apparent that the combustor walls 40, 42 and liners 44, 46 define three concentric annular flow paths into which air from the diffuser is split. These flow paths and the structure defining them will be described simply as to their relative relations shown in the longitudinal half section and fragmentary half section found in FIGS. 2 and 3.

It will be noted that the forward ends of the liners 44 have cowl portions 44a, 46a respectively, terminating in spaced lips 44b, 46b which define the entrance for a central portion of the diffuser air stream into the open ended primary combustion chamber defined by these liners. The lips 44b, 46b are preferably rounded and somewhat thickened for strength purposes. The forward ends of the combustor walls also have mutually convergent portions 40a, 42a and are joined to the ends of the diffuser walls 26, 24 at 40b, 42b preferably in a common plane (X) normal to the axis of the engine.

The combustor wall 40 and liner 44 and also liner 46 and combustor wall 42 define flow paths 60, 62 for the diffuser air which are first divergent from the diffuser flow path and then curved to the longitudinally extending downstream portions of the liners. The outer flow paths 60, 62 provide cooling air for the combustor walls as well as supplying additional combustion air through liner openings 64 downstream of the nozzle 52, as seen in FIG. 1.

The present invention involves the manner in which air from the diffuser is diverted or turned into the outer flow paths 60, 62. The means for so diverting air into flow path 60 will be described with reference to FIG. 3 with the understanding that such means are correspondingly found in flow path 62.

Generally speaking turning of the air stream is characterized by the provision of a sharp break in the outer walls where the turn is made, i.e., the juncture of diffuser wall 24 with end 40b of the combustor wall. Further it is preferred that the angle α between the diffuser wall 24 and convergent combustor wall portion be approximately between 135° and 145°.

The entrance portion to flow path 60 is defined also by liner cowl portion 44a which, in a plane (B) extending from edge 40b, normal to the initial, nominal divergent flow direction (arrow V) is spaced from wall portion 40a a distance between .8 and 1.0 h where h equals half of the height H of the diffuser outlet passage in plane X. It is also preferable that the cowl lip 44b extend into the diffuser air flow path beyond plane B a further distance of between .1 and .3 h.

Another preferred relation is that the wall portions 40a and 44a be parallel and further remain straight for a distance of approximately 2 h. Thereafter these walls are gently curved to the illustrated downstream portions.

With the described relationships the air stream is diverted into flow path 60 in a fashion which at all times maintains air separation at a fixed point, thereby eliminating, or at least greatly reducing, any undesirable shifting which can cause self excited acoustical vibration and other harmful effects.

As previously indicated the diffuser is chosen with an outlet to inlet area ratio between 1.6 and 1.7. This relation is made because within these limits it has been found that for most axial flow compressors there is little or no separation of the air stream from the diffuser walls 24, 26 and yet a sufficient pressure increase is obtained for effective combustor operation, particularly in combination with the described flow turning means.

Assurance is thus had that the air stream is "anchored" to the diffuser wall 24 immediately upstream of the sharp break at the forward edge 40b of the combustor wall.

As the air stream is turned by cowl portion 44a toward the nominal direction of arrow V the air stream separates from wall portion 40a immediately downstream of edge 40b as indicated by reference character s and the air flow lines in FIG. 3. Once turned, it has been found that the diverted air stream will reattach itself to the combustor wall 40a at a distance of 1 to 2 h from the turning point, particularly where as straight parallel flow path is defined. Hence it is preferred that the portions 40a and 44a have a minimum length of 2 h from plane B.

With the diverted air stream reattached to the walls defining its flow path, it can then be curved back to a longitudinal direction along the downstream portions of the combustor. By having the diverted stream "anchored" and separated at fixed longitudinal points extending circumferentially of the annular flow path, pressure gradients and resultant vibrations and thermal hot streaks are greatly minimized, if not eliminated. These ends are further attained with a minimum of energy losses which is attributed to the specified relationships of the cowl portions 44a and 46a.

The scope of the inventive concepts herein described is not necessarily limited to the specific structure described but is to be derived from the following claims.

Having thus described the invention what is claimed as novel and desired to be secured by Letters Patent of the United States is:

1. In a gas turbine engine having a diffuser for receiving air from a compressor and a combustor to which air is directed from the diffuser to support combustion therein, said diffuser comprising mutually divergent inner and outer walls defining an annular flow path, said combustor comprising inner and outer walls respectively connected to said diffuser walls and a pair of spaced liners spaced therebetween and defining three concentric flow paths, the forward ends of said liners having mutually convergent cowl portions terminating in spaced lips defining the entrance to the central one of said concentric flow paths, the forward end portions of said combustor walls also being mutually convergent and defining in combination with adjacent liners the outer of said concentric flow paths, which are divergent from said central flow path characterized in that the ratio of the outlet to inlet area of said diffuser is below a value required to insure lack of any flow separation from the diffuser walls, said convergent portion of at least one combustor wall joins the diffuser wall at a sharp angle and the convergent portion of the adjacent liner defines in combination with the convergent portion of said one combustor wall an air flow path having a nominal divergent direction, said adjacent liner extending inwardly at least to a plane (B) extending normal to said nominal divergent flow path and from the sharp angle of the juncture of said diffuser and combustor walls.

2. A combination as in claim 1 wherein the angle (α) between the joined combustor and diffuser walls is between approximately 135°–145°.

3. A combination as in claim 1 wherein the said adjacent combustor wall and liners thereto are spaced apart a distance, in said plane (B), between .8 and unity of half the distance (h) between the diffuser walls at their discharge ends.

4. A combination as in claim 3 wherein the said liner extends upstream from said plane (B) a distance between .1 and .3 of half the distance (h) between the diffuser walls at their discharge ends.

5. A combination as in claim 1 wherein the convergent portion of the other combustor wall joins the other diffuser wall at a sharp angle and the convergent portion of the other adjacent liner defines, in combination with the convergent portion of said other combustor wall, a second air flow path having a nominal divergent direction, said other adjacent liner extending inwardly at least to a plane (B) extending normal to said other nominal divergent flow path and from the sharp angle of the juncture of said other diffuser and combustor walls.

6. A combination as in claim 5 wherein the convergent combustor wall and liner portions defining said divergent paths are straight and parallel and extend downstream of said plane (B) a distance approximately equal to the distance (H) between the diffuser walls at the discharge ends thereof.

7. A combination as in claim 6 wherein the combustor walls and the liners adjacent thereto are respectively spaced apart a distance, in said plane (B), between .8 and unity of half the distance ($h$) between the diffuser walls at their discharge ends.

8. A combination as in claim 7 wherein the angle ($\alpha$) between the joined combustor and diffuser walls is between approximately 135°–145° and the liner walls extend inwardly from plane (B) a distance between .1 and .3 of half the distance ($h$) between the diffuser walls at their discharge ends.

References Cited
UNITED STATES PATENTS 2,860,483 10/1958 Fox _____ 60—39.65
3,154,516 10/1964 Seifferlein _____ 60—39.72

JULIUS E. WEST, *Primary Examiner.*